United States Patent [19]
Becke

[11] 4,206,894
[45] Jun. 10, 1980

[54] AIRCRAFT CONTROL

[76] Inventor: Walter Becke, Wëëningerstr. 15, Fürstenzell, Fed. Rep. of Germany

[21] Appl. No.: 9,569

[22] Filed: Feb. 5, 1979

Related U.S. Application Data

[63] Continuation of Ser. No. 813,505, Jul. 7, 1977, abandoned, which is a continuation of Ser. No. 658,056, Feb. 13, 1976, abandoned.

[30] Foreign Application Priority Data

Feb. 19, 1975 [DE]  Fed. Rep. of Germany ....... 2506974

[51] Int. Cl.² ........................ B64F 1/36; B64C 15/00
[52] U.S. Cl. .................. 244/114 R; 244/12.1; 244/110 R; 180/116
[58] Field of Search ............... 180/122, 116, 117, 126, 180/125, 127; 188/270; 244/12.1–12.5, 23 R, 110 B, 114 R, 114 B, 110 E, 110 R, 113, 55, 58, 52, 51; 60/226 A; 404/2, 6, 9; 104/23 FS, 134

[56] References Cited

U.S. PATENT DOCUMENTS

| | | | |
|---|---|---|---|
| 2,728,539 | 12/1955 | Morrill, Jr. | 244/114 R |
| 3,106,372 | 10/1963 | Kutney | 244/52 |
| 3,143,322 | 8/1964 | Mainwaring | 244/114 R |
| 3,231,038 | 1/1966 | Weiland | 180/116 |
| 3,310,262 | 3/1967 | Robins et al. | 244/55 |
| 3,545,210 | 12/1970 | Cresswell | 244/12.5 |
| 3,648,806 | 3/1972 | Marks | 244/110 B |
| 3,729,934 | 5/1973 | Denning et al. | 60/226 A |
| 3,845,716 | 11/1974 | Bertelsen | 104/23 FS |

FOREIGN PATENT DOCUMENTS

| | | | |
|---|---|---|---|
| 935046 | 11/1955 | Fed. Rep. of Germany | 244/52 |
| 733243 | 7/1955 | United Kingdom | 244/52 |
| 898417 | 6/1962 | United Kingdom | 244/52 |
| 993899 | 6/1965 | United Kingdom | 244/52 |

*Primary Examiner*—Galen L. Barefoot
*Attorney, Agent, or Firm*—Jerry Cohen

[57] ABSTRACT

Takeoff, flying, normal landing and emergency landing of aircraft (including space/reentry vehicles as well as airplanes) is improved in respect of minimum speed limits and necessary runway lengths by a control system comprising aspiration of ambient air in a direction counter-current to the relative wind direction established by motion of the craft, these effects preferably further supplemented by a cushioning and sheltering effect established by a grooved runway.

5 Claims, 7 Drawing Figures

AIRCRAFT CONTROL

This is a continuation of application Ser. No. 813,505, filed July 7, 1977, now abandoned which was a continuation of Ser. No. 658,056, filed Feb. 13, 1976, now abandoned.

BACKGROUND OF THE INVENTION

The invention concerns a takeoff, flying and landing aid or emergency landing aid for airplanes or for flight systems in spacecraft.

The profile of the airplane wing and its angle of incidence is a determining factor in the lift of an airplane. Lift coefficients increase with angle of incidence up to a specific maximum value. If this critical limit is exceeded, the lift values decrease rapidly until finally the airplane stalls.

In addition, the limits obtained for lift in airplane wings are relatively low and thus require large wing lifting surfaces and very high minimum speeds during flying, take-off, and landing. These high minimum speeds further require very long take-off and landing runways and are dangerous for take-offs and landings. Approximately 70% of all airplane accidents in commercial aviation occur, according to statistics, during take-off and landing. Yet both of these flight phases are only of short duration in comparison to total travel time. However, minimum speeds which are much too high occur below which an airplane today can neither take off or land.

During takeoff there are friction forces caused by the high thrust of the wheels of the wheel landing gear assembly which make the lifting of the airplane difficult and require unusually long take-off distances on the runway. Again, during landing the resistance forces which arise are relatively small in comparison to the braking forces during takeoff so that for today's high landing speeds, very long landing strips, and kilometer-long takeoff runways are required.

In order to produce additional lift, so-called slat approach flaps and wing-tip flaps are used. These are not sufficient, however, for a significant reduction of the high minimum speeds.

It is therefore an important object of the invention to provide increased lift for craft of the class described.

It is a further object of the invention to reduce one or more of minimum speed, friction forces, braking power requirements runway length and stall tendency of such craft consistent with the preceding object.

It is a further object of the invention to carry out one or more of the preceding objects at low cost and/or with minimal or no enlargement of the power means and fuselage of such craft.

It is a further object of the invention to increase safety of such craft consistent with one or more of the preceding objects.

SUMMARY OF THE INVENTION

The invention comprises forming, beneath the fuselage and the wing of aircraft (including airplanes and air flight systems of spacecraft) air cushion systems with a strong lift, which come into play via propulsion and via the relative wind (headwind) during take-off, landing and also during flight, whereby a reduction in the above mentioned minimum speed is produced. This is carried out, according to the invention, by several related means including forming takeoff and landing runways with grooves or depressions, blasting air or other gasses in the flight direction and opposite the direction of air flow by means of devices mounted in the aircraft (the blasting means comprising nozzles, exhaust pipes or openings which are arranged in the vicinity of the central part and rear half of the aircraft fuselage and/or the wing or beneath the same, such such counter-current devices beneath the fuselage and the wing aspirating air from the rear and blast it out in the flight direction opposite to the direction of relative wind air flow.

Through the invention, a significant increase in liftoff is produced and thus also a reduction in minimum speed by means of the counter-current devices and the grooved or depression-type formation of the takeoff and landing runways, either taken together or separately. In this way, shorter takeoff and landing strips are required. By means of the increased lift, lifting surfaces can be considerably smaller and in this way greater flight speeds can be obtained. The increased lift produced by the counter-current devices make possible flying at greater heights in rarefied air. The lifting forces and the smaller minimum speed produced by the invention are suitable also for takeoff, flying, and landing in flight systems of earth launched or reentry spacecraft as well as of airplanes.

The pilot can, if necessary, engage the counter-current devices found under the wings and beneath the fuselage so as to increase lift, for example, during flight, in case of imminent danger, for emergency landings, upon entering rarefied air in space, and like situations. The increased ground lift operates as a kind of air cushion on the grooved takeoff and landing runways, whereby takeoffs and landings are to a great extent facilitated. During takeoff, the thrust of the wheels of the landing gear is greatly reduced by means of the increased ground lift and, indirectly, the friction force is also reduced as well as drag when taxiing so that a rapid liftoff is made possible. Takeoff time and runway space are thus advantageously reduced. Airplanes are exposed without protection to winds and gusts of wind on kilometer-long takeoff and landing runways of today's airports, whereas airplanes and spacecraft at the bottom of the grooved takeoff and landing runways are much better protected against crosswinds.

Other objects, features and advantages of the invention will be apparent from the following detailed description of preferred embodiments of the invention taken in connection with the accompanying drawing in which:

DETAILED DESCRIPTION OF PREFERRED EMBODIMENTS

Figures 1, 2:
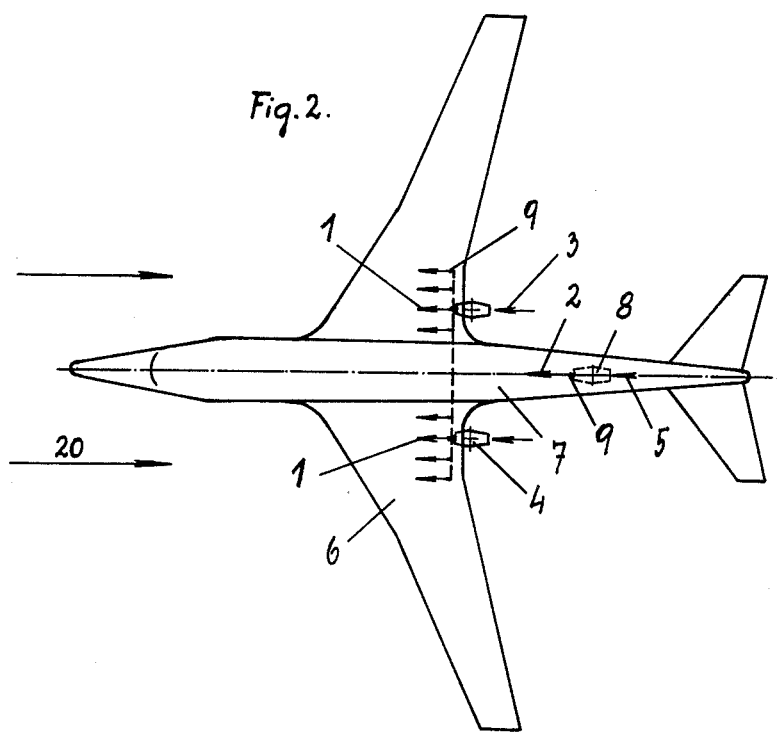
FIGS. 1 and 2 are side and top views, respectively, of an airplane incorporating counter-current gas directors according to a preferred embodiment of the invention.

FIG. 1 shows an airplane in vertical projection and FIG. 2 shows the same in horizontal projection in which an air blast device 4 is built in underneath the wings 6 on each side of the airplane. These air blast devices are connected with a piping system on which several nozzles 9 are introduced symmetrically next to one another in the rear section of the airplane under the wings. These nozzles blow out the air 3 aspirated from the rear by the air blast device to the front 1. Also, there is an air blast device 8 under fuselage 7 in the rear section of the same, which aspirates air 5 from the rear and blows it out to the front 2 by means of nozzles 9. Instead of air blast devices 4, 8 pressure vessels (e.g., for compressed or liquid air, gasses, and the like) can be connected to the nozzles 9. The air 1, 2 blown to the front and opposite to the direction 20 of the relative wind by the counter-current device(s) is compressed as a consequence of the counter-current blowing and forms an air cushion under the wings and fuselage and thereby causes a basic increase in lift and lower minimum speeds in the airplane.

Figure 3:
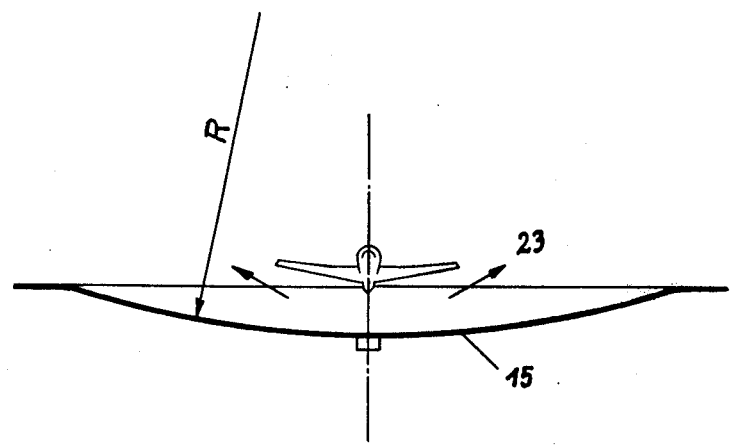
FIGS. 3 and 4 are cross and longitudinal section views, respectively, of a curved runway operating in conjunction with a preferred embodiment of the invention.

FIG. 3 shows a grooved runway 15-16 in cross section, the ground of which is circular with radius R, whereby a strong lift is produced at ground level during takeoff and landing. The ground can also be in the shape or an ellipse of other curved form, or straight in the center and curved on the sides, or can be made in a straight line. The increased lift at ground level then operates as an air cushion onto which the landing aircraft touches down with greatly reduced landing speed.

Figure 4:
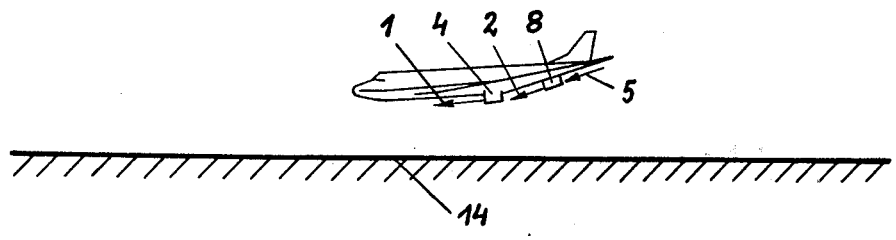

FIG. 4 shows a straight landing runway in longitudinal section. By means of air blast devices 4, 8 of the counter-current device, which are arranged underneath in the rear section of the wing and of the fuselage, air 1, 2 is blown out to the front. Accordingly, these air currents 1, 2 are directed opposite to the relative wind; they are then compressed under the wings and fuselage and thus bring about a strong lift. Takeoff and landing with the aid of the counter-current device can also be accomplished at conventional airports and runways.

Figure 5:
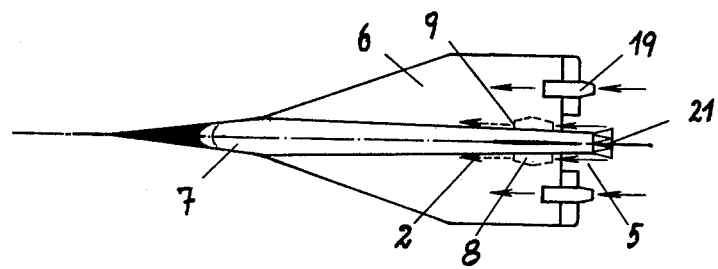
FIGS. 5 and 6 show a spacecraft in top and side views, respectively, the latter including a section of curved runway in accordance with a preferred embodiment of the invention.

FIG. 5 shows a spacecraft before and during landing viewed from above. Its extremely high speed is braked before landing by reversing the thrust of jets 19 to the front or by special braking motors to a lower landing speed. Under fuselage 7 in the rear part of this craft are found the air blast devices 8 acting as counter-current devices by blowing air aspirated from the rear 5 by means of nozzles 9 to the front 2. Wings 6 are formed compatibly to the extremely high speeds of rocket propulsion with a long drawn out section running into a pointed front section with very small wingspread. The air (23, FIG. 3 or 24, FIG. 7) dammed up beneath the wings in the grooved runway cannot escape to the side as easily as it can with a straight runway, which also contributes to the increase in ground liftoff.

Figure 6:
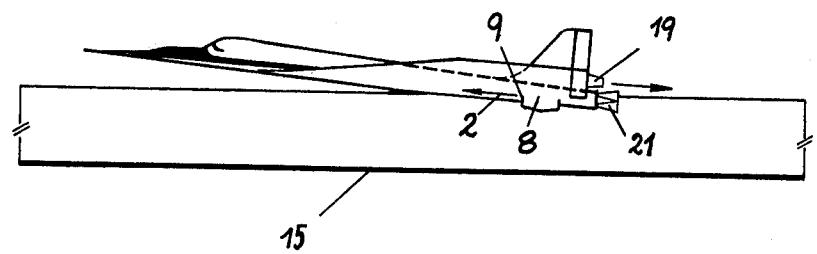

FIG. 6 shows a grooved takeoff runway 15 in longitudinal section with a spacecraft taking off using jet engines 19 for takeoff and air flight while rocket engines 21 are provided for space flight. The drag during taxiing is greatly reduced according to the invention by means of increased liftoff which is brought about by the grooved formation of the takeoff runway. The counter-current devices 8 can be activated during takeoff and during flight in order to obtain an additional increase in lift.

Figure 7:
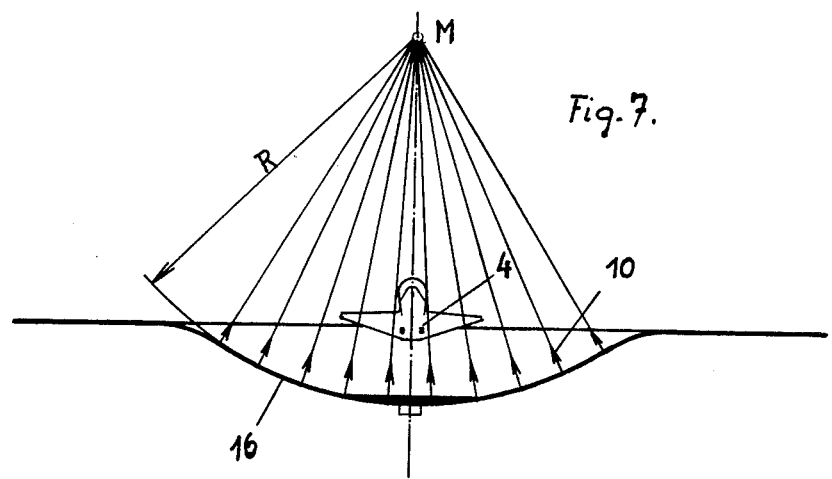
FIG. 7 is a cross section of a curved runway with a glider landing showing the effect of varying radius of curvature.

FIG. 7 shows a grooved landing runway 16 in cross section with a landing space glider. The air is aspirated from the rear and blown out to the front via the air blast counter-current devices 4. The ground of this landing strip is straight in the center and curved on both sides. The grooved formation of a takeoff on a landing runway has as a consequence a strengthening of the ground effect. This phenomenon can be theoretically explained as follows. In gliders one can observe a considerable reduction in the rate of vertical descent during landing close to ground level, which is attributed, as is known, to the "ground lift" phenomenon which occurs at ground level. The lines of force of this lift are perpendicular to the ground surface and therefore operate vertically in a straight landing strip. Now, if the runway is grooved, e.g., hollowed out in circular cross section according to the present invention, then the lines of force which are directed perpendicular to ground level can no longer operate vertically, but rather operate radially, in the direction of the center point M of the circular recess. There occurs a concentration of force lines and thus an increase in ground lift. The smaller the radius R of the circular recess, the greater the concentration of force lines and thus also the lift at ground level. Because of the pressure head (barrier effect) of air mass blown into the grooved landing-runway the landing of the space-glider (spacecraft) takes place on a kind of an air cushion and because of the fact that two systems of air cushions are working together, a low landing speed may be achieved.

The elongated channel form runways shown in FIGS. 3, 6 and 7 are characterized at least in a height/width relation that produces an inherent compressed air effect, a limit which will vary for different craft and speeds of takeoff or landing and more preferably in a tight radius of curvature (over curving portions), as shown in FIG. 7, such that the onthogonal ground vector 10 reaches angle of less than 75° relative to horizontal.

The counter-current devices 4, 8 may comprise the standard compressor of a turbocompressor at engine (or fan of a turbofan) operated in reverse or a special compressor used solely for counter-current operation or a simple pipe connected to a gas source, but preferably surrounded by an ejector nozzle.

The present invention is to be distinguished from state-of-the-art thrust reversers which blast hot exhaust gasses to the front of the aircraft to slow the craft down (or which may be angled to provide upward reaction thrust but do not appreciably change its aerodynamic lift characteristics as do the various aspects of the present invention). Blasting out and aspirating air opposite to the direction of relative wind air flow respectively performed by the counter-current devices beneath the fuselage and wings an air cushion system is formed practically beneath the whole craft which air cushion produces a lift by a barrier effect on the air masses. It is advantageous to combine blasting out and aspirating air respectively by the counter-current devices according to the invention with performing take-off and landing in a grooved runway. By this means a cooperation of both air cushion systems take place, leading to an important increase of lift of the craft because of the damming effect of the groove on the air blown between the craft and said groove.

It is evident that those skilled in the art, once given the benefit of the foregoing disclosure, may now make numerous other uses and modifications of, and departures from the specific embodiments described herein, without departing from the inventive concepts. Consequently, the invention is to be construed as embracing each and every novel feature and novel combination of features present in, or possessed by, the apparatus and techniques herein disclosed and limited solely by the scope and spirit of the appended claims.

What is claimed is:

1. In aircraft having engine means to provide forward propulsion, a method of formation of an aerodynamic lift cushion system during forward movement of the craft in take-off, landing, emergency landing and flight conditions, comprising,
    (a) blowing out air beneath the craft in the direction frontally opposite to the direction of air flow of the craft's relative wind beneath the craft and substantially parallel to the lower surface of said craft,
    (b) propelling said air by at least two air blowing means separate from said engine means for movement of the craft and being arranged side-by-side and only in the rear half of and under the bottom of the fuselage and wings, respectively,
    (c) using a runway having the form of a single empty channel extending straight along the ground with respect to its longitudinal section and broadening out upwardly with respect to its transversal section so as to receive completely fuselage and wings of the craft during the take-off and landing phases on the ground.

2. A method according to claim 1 wherein said air blowing means aspirates air during forward movement of the craft in the take-off, landing, emergency landing and flight condition from behind and below the fuselage and wings and blows this air in the direction frontally opposite to the direction of air flow of the craft's relative wind beneath the craft.

3. An aircraft vehicle having at least one engine for forward movement of the craft and having a fuselage and wings and comprising air propelling means mounted thereon separately from said engine and having at least two exhaust openings arranged side-by-side under the bottom of and only in the rear half of the fuselage and the wings for blowing air in the direction frontally opposite to the direction of the craft's relative wind beneath the craft and substantially parallel to the lower surface thereof to provide an aerodynamic lift cushion below the craft during take-off, landing, emergency landing and flight.

4. The aircraft vehicle of claim 3, wherein said air propelling means are constructed and arranged to aspirate during forward movement of the craft in the take-off, landing, emergency landing and flight condition air from behind and under the fuselage and wings, respectively, and blow this air out in the direction frontally opposite to the direction of air flow of the craft's relative wind beneath the fuselage and wings.

5. The aircraft of claim 3, in combination with a runway having the form of a single empty channel arranged at the ground and extending straight with respect to its longitudinal section and broadening out upwardly from its transverse middle with respect to its transversal section so as to receive completely the fuselage and wings of said aircraft.

* * * * *